United States Patent
Nassor (10) Patent No.: US 6,536,034 B1
(45) Date of Patent: Mar. 18, 2003

(54) METHOD FOR MODIFYING CODE SEQUENCES AND RELATED DEVICE

(75) Inventor: Azad Nassor, Villepreux (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/242,282

(22) PCT Filed: Jun. 12, 1998

(86) PCT No.: PCT/FR98/01228

§ 371 (c)(1),
(2), (4) Date: Feb. 12, 1999

(87) PCT Pub. No.: WO98/57255

PCT Pub. Date: Dec. 17, 1998

(30) Foreign Application Priority Data

Jun. 13, 1997 (FR) .............................................. 97 07321

(51) Int. Cl.⁷ ................................................ G06F 9/45
(52) U.S. Cl. ........................ 717/4; 717/2; 717/3; 717/5; 717/11; 710/22; 710/23; 710/24; 710/25
(58) Field of Search ................................ 717/5, 2, 3, 4, 717/11; 710/22, 23, 24, 25

(56) References Cited

U.S. PATENT DOCUMENTS

| | | |
|---|---|---|
| 4,831,517 A | 5/1989 | Crouse |
| 5,485,629 A | 1/1996 | Dulong |
| 5,748,981 A * | 5/1998 | Patchen et al. ................. 710/8 |

OTHER PUBLICATIONS

IBM Technical Disclosure Bulletin, "Simplifying a Branch History Table", vol. 36, No. 12, pp. 433–434, Dec. 1993.*
Melear, "Integrated memory elements on microcontroller devices", IEEE, pp. 507–514, Sep. 1994.*
Leupers et al., "Retargetable assembly code generation by bootstrapping", IEEE, pp. 88–93, May 1994.*
"Maintainable ROS Code Through the Combination of ROM and EEPROM" IBM Technical Disclosure Bulletin, No. 32, No. 9A Feb. 1, 1990, pp. 273–276, XP000083070.

\* cited by examiner

*Primary Examiner*—Kakali Chaki
*Assistant Examiner*—Ted T. Vo
(74) *Attorney, Agent, or Firm*—Miles & Stockbridge P.C.; Edward J. Kondracki (57) ABSTRACT

The present invention relates to a process and a device for modifying code sequences written into a first memory (2) of a medium. A central processing unit (1) executes code sequences and the first memory contains a main program comprising at least one code sequence executable by the central processing unit (1). The first memory also comprises a second, programmable nonvolatile memory (3), and a third working memory (4). A branch table TAB_DER contained in the second programmable memory contains at least one field containing reference data for a new code sequence stored in one of the memories. Branching instructions allow a deferred branch from the executed code sequence to the new code sequence written into one of the three memories. Instructions in the new code sequence allow the return to a point of the code sequence executed before the branch.

23 Claims, 7 Drawing Sheets

Jump to the address previously loaded into the vector of IT.

TAB-DER

| No. of the orientation point | value of the timer | jump address |
|---|---|---|
| 1 | ΔT1 | Adr_1 |
| 3 | ΔT3 | Adr_3 |
| 4 | ΔT4_1 | Adr_4_1 |
| 4 | ΔT4_2 | Adr_4_2 |
| 6 | ΔT6 | Adr_3 |
| 0 | 0000 | 0000 |

FIG. 4A

TAB-SEC

| No. of the orientation point | minimum value | maximum value |
|---|---|---|
| 1 | ΔTmin1 | ΔTmax1 |
| 2 | ΔTmin2 | ΔTmax2 |
| 3 | ΔTmin3-1 | ΔTmax3-1 |
| 3 | ΔTmin3-2 | ΔTmax3-2 |
| 4 | ΔTmin4 | ΔTmax4 |
| 5 | ΔTmin5-1 | ΔTmax5-1 |
| 5 | ΔTmin5-2 | ΔTmax5-2 |
| 6 | ΔTmin6 | ΔTmax6 |

METHOD FOR MODIFYING CODE SEQUENCES AND RELATED DEVICE

CROSS REFERENCE TO RELATED APPLICATION

The subject matter of this application is related to the subject matter of application Ser. No. 08/981,607 which is incorporated herein by reference.

BACKGROUND OF THE INVENTION

1. Field of the Invention

The present invention relates to a process for modifying code sequences and the associated device.

2. Description of Related Art

The present invention relates to computer programs, particularly those intended to be recorded on a medium in such a way that they cannot be modified, at least not easily. These media are integrated into a data processing system comprising, among other things, a central processing unit, a working memory, a nonvolatile memory and input/output means. More specifically, this data processing system can be incorporated into a chip card. In this case, the card contains a circuit comprising at least one microprocessor, a read-only memory containing a program and possibly data, a working memory and a programmable nonvolatile memory. Advantageously, the circuit is designed in monolithic form. The nonvolatile memory can store data and/or code; thus, the microprocessor can execute this code just in the same way as the code stored in read-only memory. Hence, there are two types of memory in one card; the content of the first memory is written when the circuit is manufactured and cannot be modified. The content of the second is initially blank, the values being written during the normal utilization of the object.

These days, chip cards can technically meet many needs. The program incorporated into the card, also called the "operating system," makes it possible to adapt the functions of the card to its end use. Currently, the operating system is stored in a ROM that is etched during the production of the integrated circuit. The modification of the program in order to meet new requirements is a long operation that poses a huge problem when the client is pressed for time. Moreover, this operation is very costly; this discourages many "small" clients who wish to buy several thousand cards, and often they settle for a card that only partially meets their expectations. One solution is comprised of using an existing mask and adding the functions requested by the client into the programmable memory or of modifying the functions existing in ROM.

The capability to input and execute additional code in programmable memory offers the advantage of being easily able to add new functions to an old program or to adapt old functions to specific needs.

Application Ser. No. 08/981,607 filed Dec. 27, 1998, for "Method And Device Enabling A Fixed Program To Be Developed", which is assigned to the assignee of the present invention describes a specific mechanism for branching a program during the execution of certain instructions. The preceding invention is comprised of establishing polling points and orientation points at certain locations in the ROM, using respective instructions. a polling point is indicated by a number and makes it possible to access a routine in the programmable memory if there is an existing code sequence corresponding to the address indicated by this number. If there is, a flag is set and the branch address is stored in RAM. An orientation point is active if a polling point has previously been executed. If it has, the branch is triggered by having in the normal program execute a jump to the programmed address. The code sequence to be executed can be in programmable memory or read-only memory.

However, this embodiment entails several problems if there are a number of modifications in the execution of the program that must be able to be handled. In this case, it is necessary to implement a large number of orientation points in the read-only memory. In the extreme, if high adaptability is desired, the program contains more code for executing branches than there is code constituting the main program. The multiplicity of these points is a major drawback if the size of the read-only memory is limited. Moreover, the execution time increases in proportion to the number of points. If the number of branch points is limited to adapt to constraints, the embodiment loses flexibility, since it does not make it possible to branch a program during the execution of any instruction whatsoever.

SUMMARY OF THE INVENTION

The object of the present invention is to provide a device that makes it possible to correct certain abnormalities in the execution of a fixed program, and thus makes it possible to correctly run, or easily add functionalities to, an existing program, while optimizing the code sequence to be written.

This object is achieved by the fact that the device for modifying code sequences written into a memory of a medium comprising a central processing unit capable of executing these code sequences, said memory containing a main program executable by the central processing unit, which also comprises a second programmable nonvolatile memory, possibly containing new executable code sequences, and a third working memory, is characterized in that a branch table TAB-DER contained in the second programmable memory contains at least one field containing reference data for a new code sequence, branching means allowing a deferred branch from the executed code sequence to the new code sequence written into one of the three memories and means in the new code sequence allowing the return to a point of the code sequence executed before the branch.

Another object of the present invention is to interrupt the normal running of a program prior to the execution of any instruction, even with a limited number of orientation points.

This object is achieved by the fact that the branching means comprise activatable orientation instructions (IORi) previously stored in the memory containing the code of the main program, each orientation instruction being associated with a reference i of the branch table TAB-DER written into programmable memory.

According to another characteristic, each orientation instruction (IORi) activated triggers the execution of a new code sequence comprising:

means for reading in the table TAB-DER of the programmable memory a time delay $\Delta Ti$ corresponding to the reference of the orientation instruction, this time delay making it possible to defer the triggering of an interrupt that executes a jump to a new code sequence whose address (Adri) is indicated in the table, in association with the time delay, means for storing the address (Adri) in a memory of the device, and means for starting a timer of the device, for counting down the time required for the time delay of the jump.

Another object of the present invention is to make it possible to mask certain so-called sensitive operations performed by the central processing unit.

This object is achieved by the fact that the device for modifying code sequences comprises a second table TAB_SEC stored in the memory of the device and associating with each branch point (i) a time interval [ΔTmini; ΔTmaxi] associated with the time delay ΔTi prior to the execution of a new code sequence, and means for verifying that the time delay is authorized by the associated time interval supplied by this table.

According to another characteristic, the device for modifying code sequences comprises means that allow the time delay ΔTi to be shifted by the value of the time interval [ΔTmini; ΔTmaxi].

According o another characteristic, the device for modifying code sequences comprises means for triggering an error message when the time delay ΔTi is within the time interval.

According to another characteristic, the device for modifying code sequences comprises, following the end of the time delay (ΔTi) when the timer reaches the null value, means for triggering an interrupt, means for storing the current value of a program counter register PC in a stack, then means for branching the program to the address defined in the part of the ROM containing interrupt vectors, which supply the start address of the code sequence of the interrupt, means for verifying that the value Val_PC of the program counter register PC stored in the stack is not an address value of a sensitive sequence contained in a table TAB_SEC, and means for modifying the execution of the operations.

According to another characteristic, either the verification means sense that the value of the program counter register is contained by TAB_SEC in the interval [Adrdeb_i, Adrfin_1] corresponding to an interruption of the program during a sensitive sequence, and the means for modifying the execution of the operations of the card return a message indicating that its security has been breached and are inhibited, or the verification means sense that the value Val_PC of the program counter register is contained in the interval ]Adrfin_i, Adrdeb_i+1 corresponding to an interruption of the program during a nonsensitive sequence, and the means for modifying the execution of the operations then authorize the program to execute the new code sequence whose start address was stored during the execution of the orientation instruction (IORi).

According to another characteristic, the device for modifying code sequences comprises a frequency source for the timer that is different from the frequency source that allows the central processing unit to run the program, the value of the time delay (ΔTi) programmed into the branch table TAB_DER being calculated so as to allow the program to be interrupted at a given address, and the TAB-DER comprises, for each value of the time delay, an additional element containing this given address and means for comparing the address of the instruction interrupted by the interrupt to the one indicated in the table, and for triggering an alarm.

According to another characteristic, the device for modifying code sequences comprises alarm triggering means for inhibiting the medium and for indicating an attempted fraud through a write operation in the memory.

According to another characteristic, each new code sequence ends with an orientation instruction for reloading the timer with a new value of the time delay (ΔTi).

A final object is a process for modifying fixed code sequences written into a medium comprising a central processing unit and a memory.

This object is achieved by the fact that the process for modifying fixed code sequences written into a medium comprising a central processing unit and a memory is comprised of providing, in at least one fixed code sequence, at least one orientation instruction (IORi) making it possible, through an interrupt deferred by a time delay, to branch the execution of the program contained in the memory to a given address, using a branch table TAB_DER, as a function of a reference i associated with the orientation instruction and within a time delay determined by the content of a line of the table corresponding to the reference i of the orientation instruction, a new code sequence executable during the interrupt generated at the end of the time delay being stored at the address contained in the table (TAB_DER).

According to another characteristic, a step that triggers the interrupt is preceded by a verification step, and the time delay is not included in an interval defined by a second, so-called security table TAB_SEC written into the nonvolatile memory of the medium.

BRIEF DESCRIPTION OF THE DRAWINGS

Other characteristics and advantages of the present invention will emerge more clearly through the reading of the following description given in reference to the appended drawings, in which.

DESCRIPTION OF THE PREFERRED EMBODIMENT(S)

Figure 1:
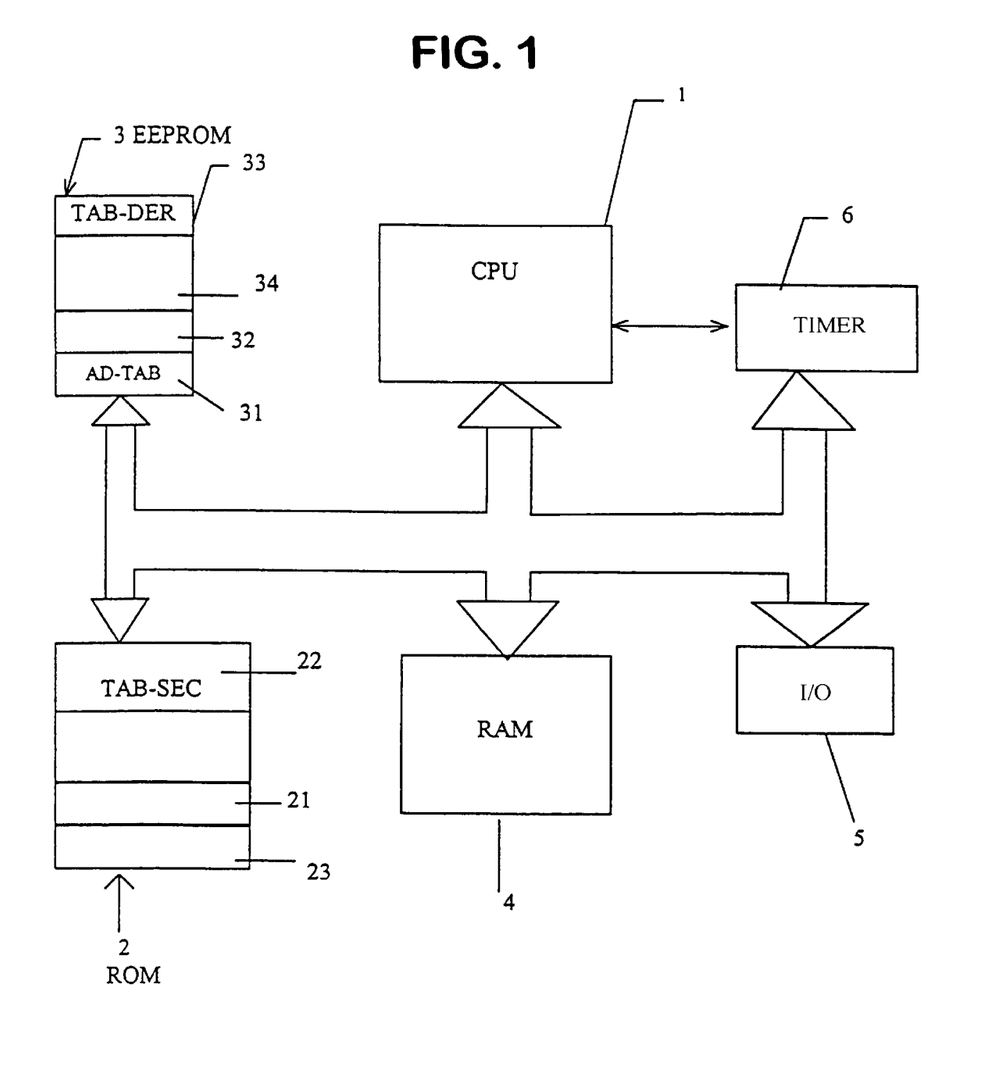
FIG. 1 represents a schematic view of the electronic circuits necessary to the implementation of the present invention.

The present invention will now be explained with the aid of an example that falls within the scope of "chip cards" and more specifically microprocessor cards. These cards generally have an integrated circuit whose general diagram is represented in FIG. 1. This circuit has a central processing unit (1) connected by an address and data bus to a nonvolatile memory, for example of the ROM type (2) containing the main program, a programmable nonvolatile memory of the EEPROM type (3), a working memory RAM (4), an input-output interface I/0 (5) and a timer (6). The timer can generate an interrupt, thus interrupting the normal operation of the program run by the central processing unit. The interrupt is associated with a vector. The latter is the start address of the interrupt routine. It is the address of the first instruction of the sequence that handles the interruption. A means for inhibiting the interrupt, which may be integrated with or external to the timer, makes it possible to delay and even cancel the interrupt. Thus, it can be handled later or not at all.

The programmable memory (3) is divided into several parts. A first part (31), called the system area, contains system information that cannot be read from the outside; this part contains, in particular, the values of the pointers that make it possible to delimit each of the other parts of the memory. A second part (32) is called the data area; it is accessible from the outside and contains mainly user data. A third part (33) contains an orientation table TAB_DER; this table contains elements in identical formats composed of at least three fields (N°Ref, ΔTi and Adri). A fourth part (34), called the sequence area, contains the code sequences that can be called by the main program using the reference numbers (N°Ref) of the orientation point and the address (Adri) read in the table. It must be noted that in a variant of the invention, the orientation table, or one or more code sequences, can be loaded into working memory RAM rather than into programmable nonvolatile memory.

The start address, called AD_TAB, of the orientation table TAB_DER is stored in the system area (31). A precise location is provided for containing this value. The actual writing of this location effectively constitutes the indication that the table is actually present and that the orientation points can be operational.

The ROM (2), which contains, among other things, the main program, is divided into three parts. The first part (21) performs the initialization of the program during a power-up. The second part (22) contains the application program. The third part (23) contains the "dormant" code, whose role is explained below.

Figure 2A:
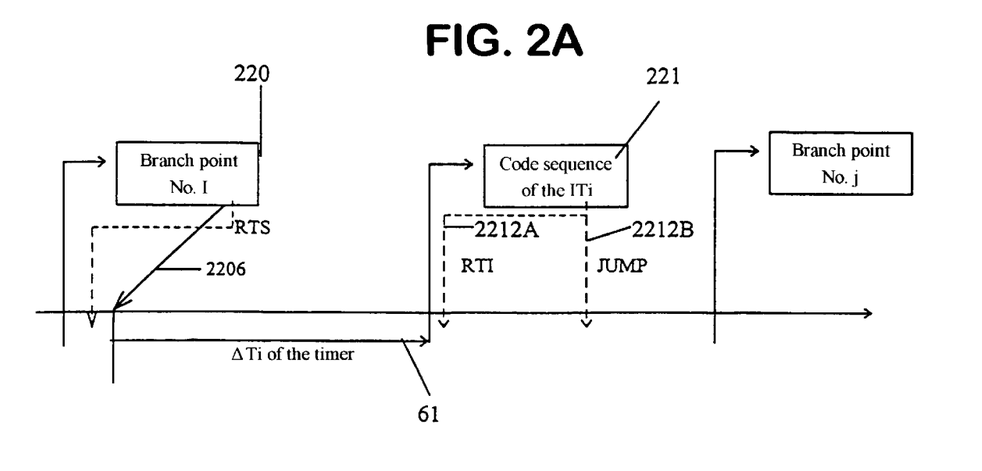
FIG. 2A represents the timing diagram of the code sequences necessary to the implementation of the present invention.
Figure 2B:
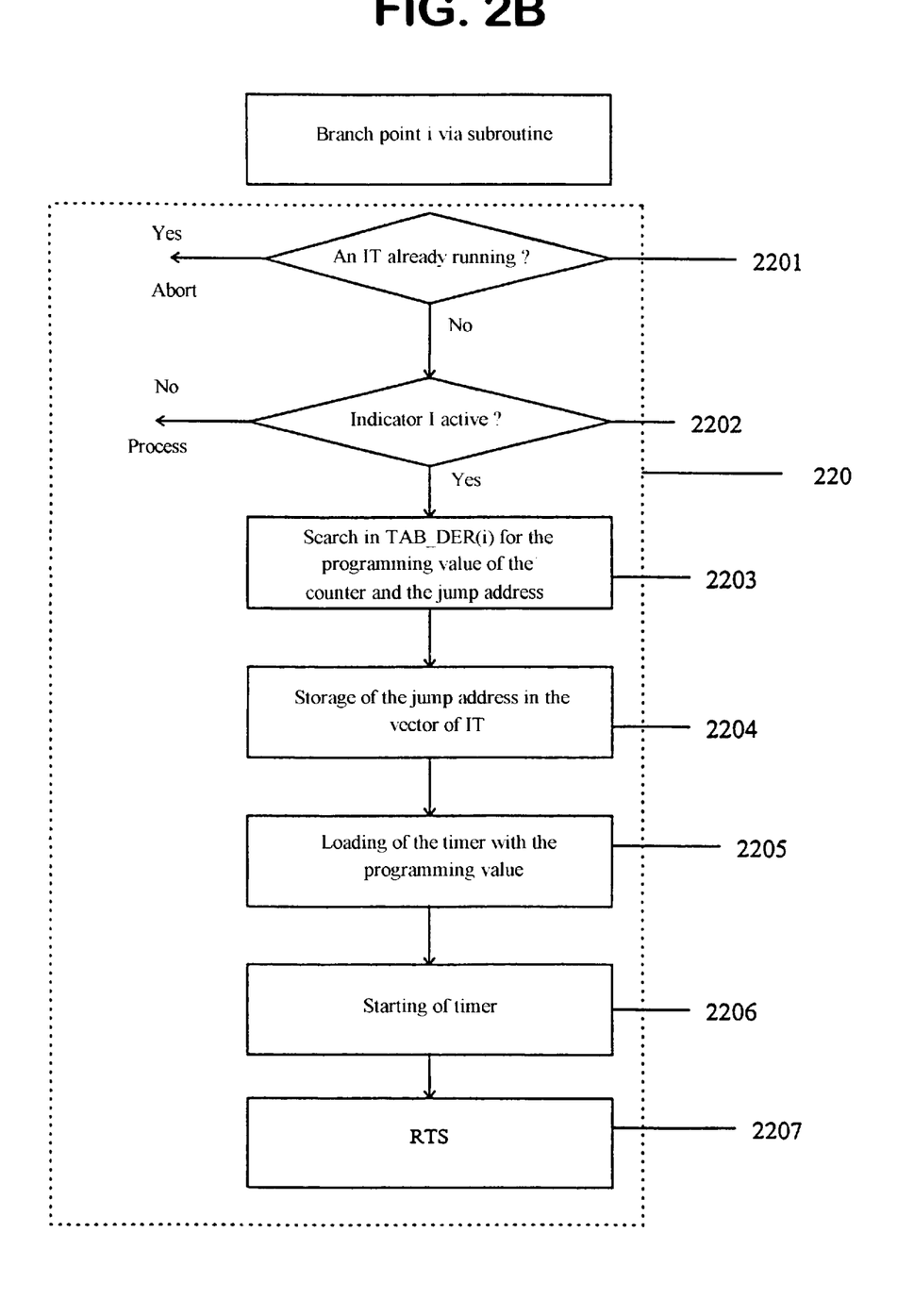
FIG. 2B represents the logical diagram of the code sequence corresponding to the activation of a branch point.

When the program reaches a branch point or orientation point (220), it executes a branch sequence represented in FIG. 2B, which comprises a first step in which the program checks to see if there is already an interrupt in progress. If so, the program is aborted, If not, the program continues with step 2202, in which it checks to see if an indicator corresponding to the branch point i is active.

If not, the program performs an error control process of the type described in the prior application. If so, the program continues with the step that searches in the table TAB-DER written into the third part (33) of the EEPROM, for the programming value (ΔTi) of the timer corresponding to the branch i and the jump address (Adrsi).

The next step 2205 allows the timer (6) to be loaded with the time value (ΔTi) provided by the line i of the table TAB_DER. Then, the next step of the program 2206 allows the timer to be started. In some microprocessors, the writing of a new value into the timer causes it to be activated, and in this case, the two steps 2205 and 2206 are combined. After this step, the branch sequence jumps, in step 2207, to the next instruction of the program it was in the process of running when it encountered a branch instruction, or orientation instruction (IOR), indicating a branch point.

Figure 2C:
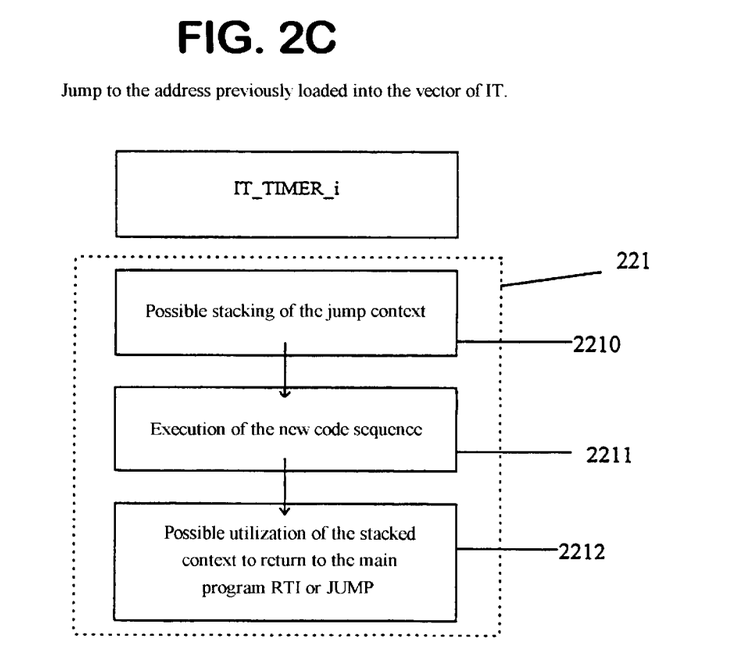
FIG. 2C represents the code sequence corresponding to the execution of the interrupt generated by the computer.

When the timer started in step 2206 has counted down the time (ΔTi) supplied by the line i of the table TAB_DER, the timer (6) triggers an interrupt in the microprocessor (1), which results in the execution of an interrupt sequence (221; FIG. 2A). This interrupt sequence, shown in detail in FIG. 2C, begins with a step for the possible stacking of the jump context (2210) in the RAM (4). Then the execution of the interrupt continues with a step (2211) for executing the new code sequence contained in either the fourth part (34) of the EEPROM (3), or the third part (23) of the ROM, at the address previously stored in step 2204. Next, the interrupt ends with a step (2212) for the possible use of the stacked context to return to the main program, either to the instruction (2212A) following the one executed before the interrupt, for example using an interrupt return instruction RTI, or by executing a jump (for example, using a jump instruction), as represented by the reference 2212B in FIG. 2A.

Thus, it is understood that by recording a table in the EEPROM, an interrupt sequence in the ROM and a branch sequence in a volatile or nonvolatile memory, it is possible to intervene at any point in the application program stored in the ROM, and to modify or add functionalities by implementing dormant code parts, or new code parts written into EEPROM, for example.

The orientation point existed before the part of the program that now needs to be modified. This orientation point has its own reference number, in this case, "1".

The table TAB_DER was entered into programmable memory and the entry corresponding to the reference number "1" was filled in as follows, for example:

| No. of orientation point | value of the timer | jump address |
|---|---|---|
| 1 | ΔT1 | Adr_1 |

Figure 3:
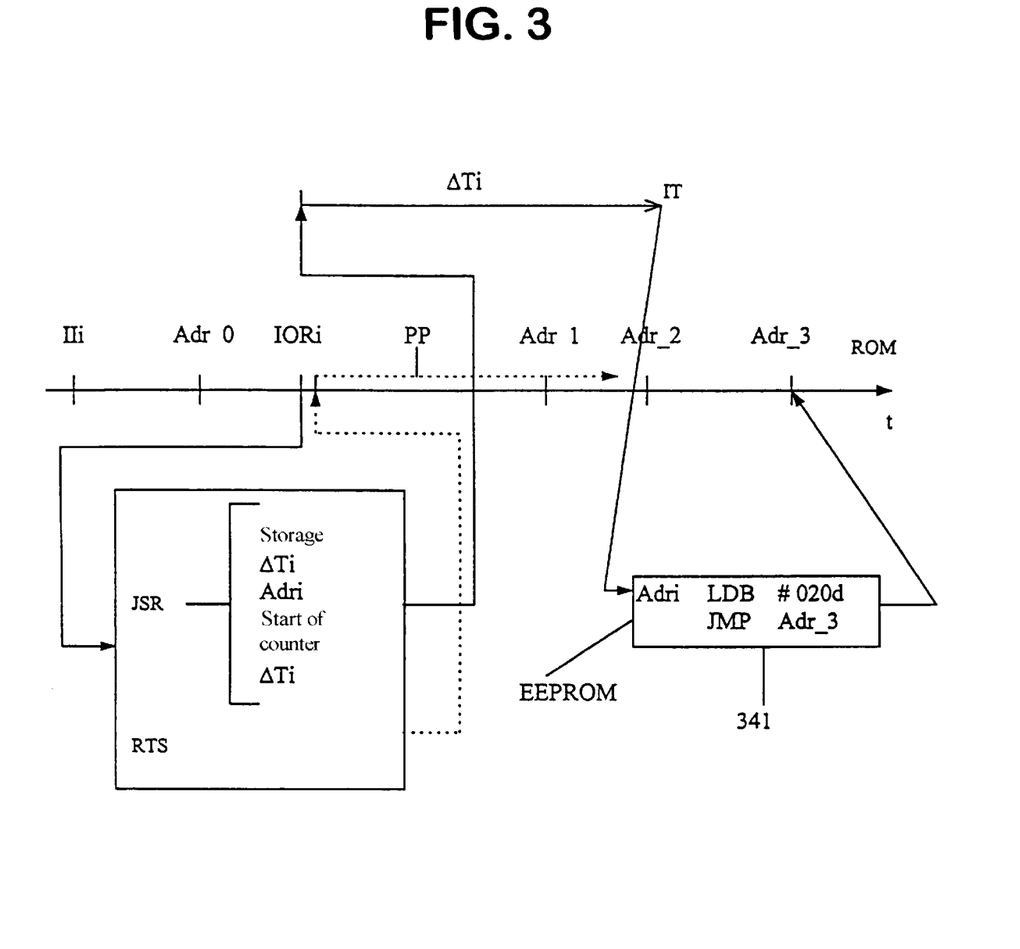
FIG. 3 represents a timing diagram of the interleaving of the code sequences of the application program for executing the orientation instruction and for executing the interrupt, in an exemplary application of the invention.

ΔT1 was calculated so as to correspond to the time required to interrupt the execution of the main program at the desired address Adr_2 (FIG. 3). In performing this calculation, the number of instructions needed to "reach" the address Adr_2 and the countdown frequency of the timer are taken into account.

First, there is a test for the presence of the orientation table. As stated above, this can amount to testing for a writing of the location containing the start address of the table TAB_DER. Next, there is a test for the presence of an interrupt i progress in the timer. If the timer is running, the execution of the branch point must be inhibited, and only the code sequence corresponding to a previous orientation point will be executed. If not, the program searches for the values written into the second and third elements corresponding to orientation point number 1. The values ΔT1 and Adr_1 are extracted from the first and second field of the element, respectively. The data register of the timer is then loaded with the value ΔT1, and the interrupt vector associated with the interrupt invoked by the timer is loaded with the value Adr_1. Finally, just before exiting from the sequence of the orientation point, the timer is started and the value stored in its data register decreases as a function of time.

The value ΔTi must be determined with great precision; it depends directly on the number of cycles that separate the moments of execution of the instruction that starts the timer and of the first instruction that should not be executed. If the timer is synchronized with the clock of the central processing unit, it suffices to add up the number of cycles in each of the instructions that separate the two above-mentioned instructions. If the timer is not synchronized with the frequency of the CPU, the calculation is tricky and can only be approximate.

If the frequency source for the timer is different from the one that allows the program to be run, then the process of the invention makes it possible to execute for example, a security control task. In effect, the values programmed into the table TAB_DER make it possible to interrupt at a given address, which address is indicated as an additional element in the table TAB_DER, and once the interrupt is active, the address of the interrupted instruction can be compared to the address indicated in the table. If they are not the same, then it can be concluded that there has been a disturbance of the frequency source, perhaps due to an attempted fraud, and the program can act in the appropriate manner (by shutting down, for example).

Figure 2D:
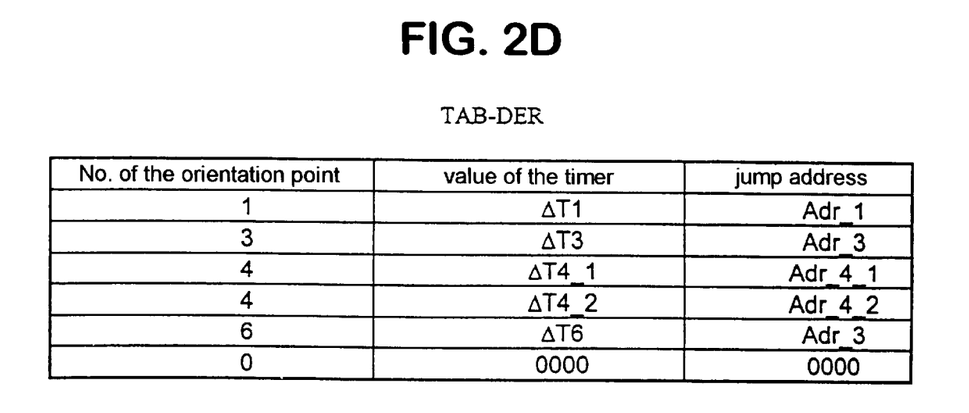
FIG. 2D represents the branch table TAB_DER.

A preferred way to implement the invention is comprised of creating-a table (FIG. 2D) in programmable memory; the first element of this table is the reference number of the orientation point, the second element is a value for loading into the timer, and the third element is the address of the code sequence to be executed.

This table (FIG. 2D) has a maximum size of 30 bytes divided into 6 lines of 5 bytes each. The first element of the table comprises one byte, which makes it possible to enter into the ROM code 255 orientation points, numbered 1 to 255. The zero value indicates that there are no more values and that the end of the table has been reached. The second value is expressed in two bytes, which allows 65536 different values for loading into the timer. Finally, the jump address is indicated in two bytes, the conventional value for microprocessors of the chip card type. This address must make it possible to execute code sequences written into programmable memory EEPROM as well as the code in ROM (dormant code).

It may be seen that the sixth line of this table TAB_DER (FIG. 2D) is set at "000," so in the present case there are only 5 orientation points that are operational: numbers 1, 3, 4 (2 entries) and 6. The orientation points 3 and 6 have the same jump address Adr_3, which means that the program modification is the same for these two points. Therefore, three branch sequences are provided. These branch sequences can be stored in the programmable memory and in a part of the ROM code, which "dormant" code can be executed with the aid of the orientation points.

Another way to manage the orientation table, which allows the programmer to avoid having to provide in memory information corresponding to the size of the table, is to provide a supplementary field that contains the address value of the next element of the orientation table. For further details, please refer to the patent application mentioned above.

Advantageously, a new code sequence can end with an orientation point, making it possible to reload the timer and therefore to add a new time delay, as shown in the preceding table for the reference number "4." This is particularly useful for producing very long time delays that exceed the capacity of the timer. In this case, the management of an interrupt timer, which is initialized with a certain start value, is implemented in the code sequence; this value represents the maximum number of time delays to be executed before programming the value written in TAB_DER into the timer. After this last time delay, the part of the code sequence related to the modification of the main program is executed.

An exemplary application of the invention is represented in FIG. 3, in which an application program written into ROM can contain a certain number of polling instructions (IIi), followed by code sequences that separate them from the corresponding orientation instruction (IORi), in accordance with the principle of French patent application No. 96/05454, filed by the Applicant.

These polling instructions (IIi) make it possible to determine whether or not the corresponding orientation instruction (IORi) is active, and if it is active, when the program reaches the orientation instruction, to branch the program to an orientation or branch point (i) whose reference number for the orientation instruction (IORi) is i.

The execution of the orientation instruction (IORi) triggers several operations. First, it triggers the reading of the orientation or branch table TAB_DER written in the area 33 of the EEPROM, in order to determine whether, at the address i of this table, the timer value ΔTi and jump address value (Adri) have been filled in, and if these values are present, the information corresponding to the timer value ΔTi and jump address value Adri is temporarily stored, for example in the RAM (4). Then the orientation instruction ends with the starting of the timer 6.

Once the orientation instruction has been executed, the application program continues to run its sequence in order, reaches the execution of the instruction indicated by the address Adr_1 corresponding to the exemplary executable code appearing in Appendix 1, executes the instruction set of this sequence, then reaches the instruction indicated by the address Adr_2, for which it has been decided to modify the corresponding value, used in subsequent operation, of the instruction of the sequence of the program, normally recorded in ROM by another value. For this reason, ΔTi is determined so that the interrupt occurs before the program executes the instruction of the address (Adr_2) and the interrupt branches the program to a code sequence at the address Adri. Thus, in the example of the program given in Appendix 1, the value 10 will need to be replaced by the value 20 in the multiplication that is carried out later at the address Adr_3.

This is obtained by the code sequence appearing in Appendix 2. Thus, it is understood that the accumulator B has been loaded with the value 20 instead of the value 10, which will change the result of the multiplication without having to modify the program written in ROM Thus, by writing new code sequences into EEPROM in the area 34, as shown in FIG. 3 in square 341, by writing a branch table TAB_DER into the area 33 of the EEPROM (3), and by putting orientation instructions in the operating system stored in the ROM of the chip card, it is possible to intervene as necessary and to modify all the instructions by choosing the time delay ΔTi and the intervention address Adri at which the new code sequence written into one of the memories of the card will be located.

The start of this program part in Appendix 1 comprises the call to an orientation point, numbered "01." Instructions then exist. Next, a specific sequence is described. First, the value of the byte pointed to by X is multiplied by the value 10; the result, expressed in two bytes, is stored in two registers, then the subroutine for writing into programmable memory is executed. The program, being fixed in ROM, is no longer modifiable, but the value "10" must be changed to "20." The following describes how the present invention can solve this problem.

The central processing unit continues running the main program (PP); FIG. 3). At the moment when the microprocessor starts the execution of the instruction at the address labelled Adr_2, the data register of the timer (6), initialized at the branch point with the value ΔTi, reaches the null value, thus triggering an interrupt (IT; FIG. 3), which allows the jump to the address Adri. Therefore, the instruction "LDB #010" is not executed. The central processing unit is redirected to the address Adri, where the code sequence appearing in Appendix 2 is located.

This small code sequence described in Appendix 2 makes it possible to load the value "20" into the register B used for the multiplication, then to return to the main program, i.e., to the address adr_3 immediately following the instruction that must be modified or not executed. The multiplication instruction at this address no longer uses the value "10" contained in the preceding instruction in the ROM code, but the value "20" contained in the new code sequence.

The following variant of the invention takes security needs into account. For security reasons, it may be advantageous not to be able to stop the execution of a program part with an interrupt. This is the case, for example, in an authentication involving a cryptographic calculation and a comparison between received and calculated values. Thus, as long as the secret key is in working memory and therefore visible through a branch sequence, interrupts must not be allowed. This is possible by inhibiting all interrupts, or at least those of the timer, during the execution of a "sensitive" program.

The inhibition of the interrupts and their reactivation are each carried out by an instruction that can be interpreted by nearly all microprocessors. These instructions generally modify one bit of the microprocessor's status register which, when it is active, prevents the triggering of the interrupt, and when it is inactive, allows interrupts. The presence of an interrupt-inhibiting instruction in ROM before a sensitive sequence ensures that the sensitive sequence is permanently protected if the reactivation instruction is put in place after the sensitive sequence.

Figure 4A:
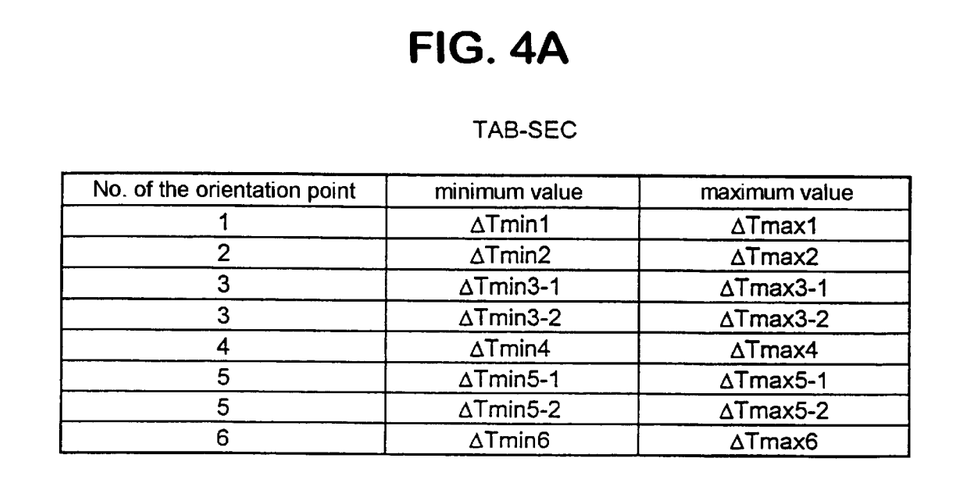
FIG. 4A represents the security table TAB_SEC.

Another method for preventing the triggering of interrupts during the execution of a sensitive sequence is to test, during the utilization of the table TAB_DER, and for each orientation point, the programming value of the timer. A locked table TAB_SEC is then provided in ROM or in E²PROM, which comprises for each orientation point of the main program a pair of values [$\Delta$Tmini, $\Delta$Tmaxi] defining an interval in which any programming value of the timer is forbidden. Advantageously, the table TAB_SEC can comprise several pairs [$\Delta$Tmini, $\Delta$Tmaxi] for the same orientation point, as shown in FIG. 4A.

The presence of the table TAB_SEC in ROM fixes the sensitive sequences, as before, whereas its presence in E²PROM makes it possible to modify the sensitive sequence areas until they are locked with a key.

For the orientation points 3 and 5, two time intervals are programmed.

During the utilization of the information in the table TAB_DER, the operating system tests to see if the value $\Delta$Ti to be written corresponding to the orientation point i belongs to any intervals [$\Delta$Tmini, $\Delta$Tmaxi]. If that is the case, a sensitive sequence would be interrupted, and that being forbidden, the operating system prohibits the write operation and returns an error message. If, on the other hand, the value $\Delta$Ti corresponding to this orientation point is not contained in the unauthorized time interval, the write operation is carried out and the orientation point becomes operational.

Figure 4B:
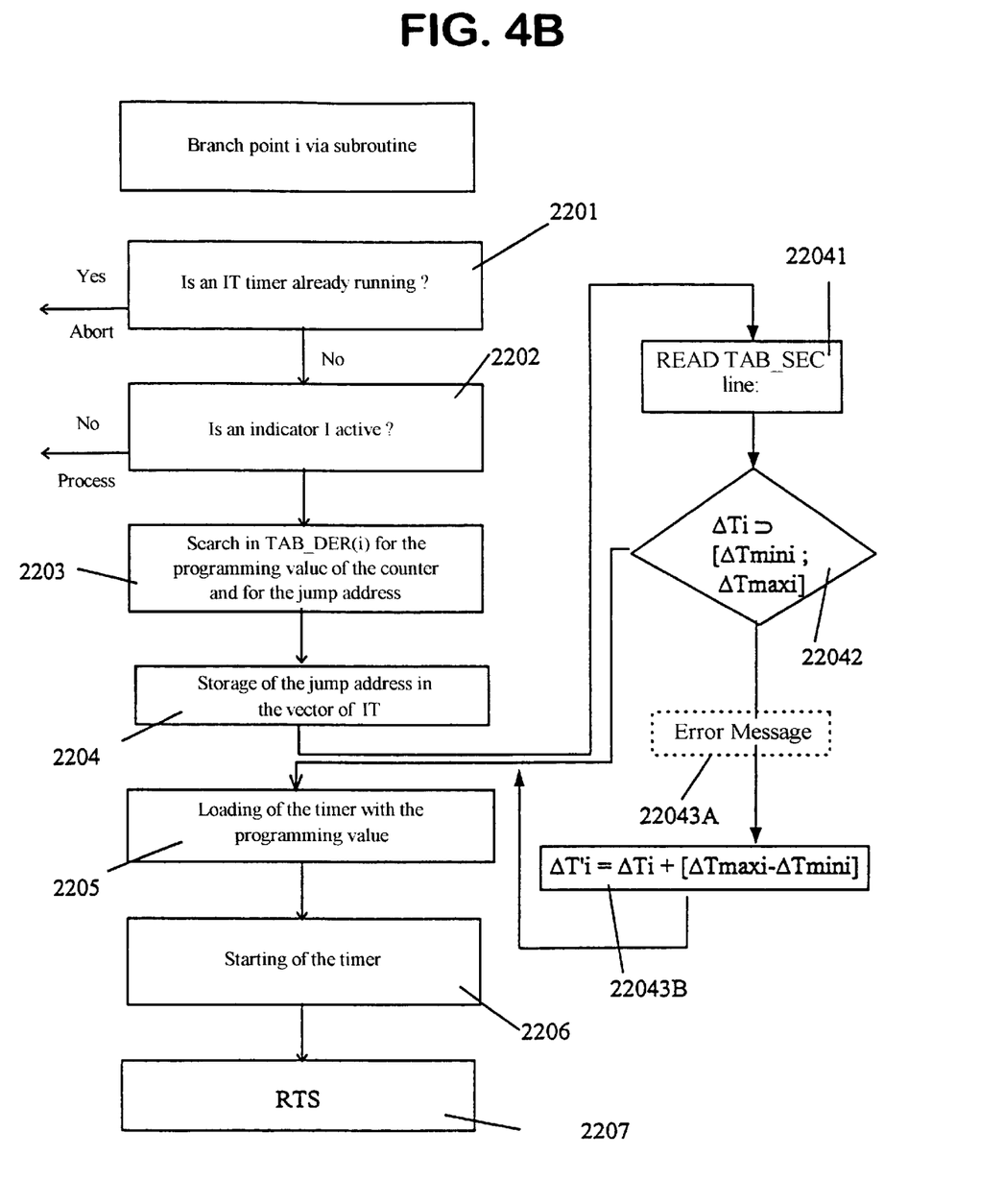
FIG. 4B represents the modification of the logical diagram of the branch sequence in case of a utilization of a security table conjointly with the branch table of the invention.

In the variant in which a security table TAB_SEC is used, the branch sequence corresponds to FIG. 4B. This sequence comprises, in addition to the steps in FIG. 2B, the following steps, added between step 2204 and step 2205 of FIG. 2B:
  a first step 22041, which is comprised of reading the security table TAB_SEC on the line i to determine the interval [$\Delta$Tmini, $\Delta$Tmaxi], and verifying, for example, that the initialization value $\Delta$Ti of the timer is not included in this interval [$\Delta$Tmaxi, $\Delta$Tmini]. The opposite logic is also possible. If the value $\Delta$Ti is not included, the process continues with step 2205. If the value ($\Delta$Ti) is included, the process continues with either step 22043A, which allows the display of an error message, or step 22043B, which executes an instruction that makes it possible to reload the timer with the value ($\Delta$Ti) increased by the interval. This defers the triggering of the interrupt by the length of the interval.

This last variant makes it possible to trigger the interrupts, but does not make it possible to intervene in sequences of the application program that must be protected because they are part of protected segments.

For the rest, the branch sequence continues in the same way as in FIG. 2B.

Figure 5:
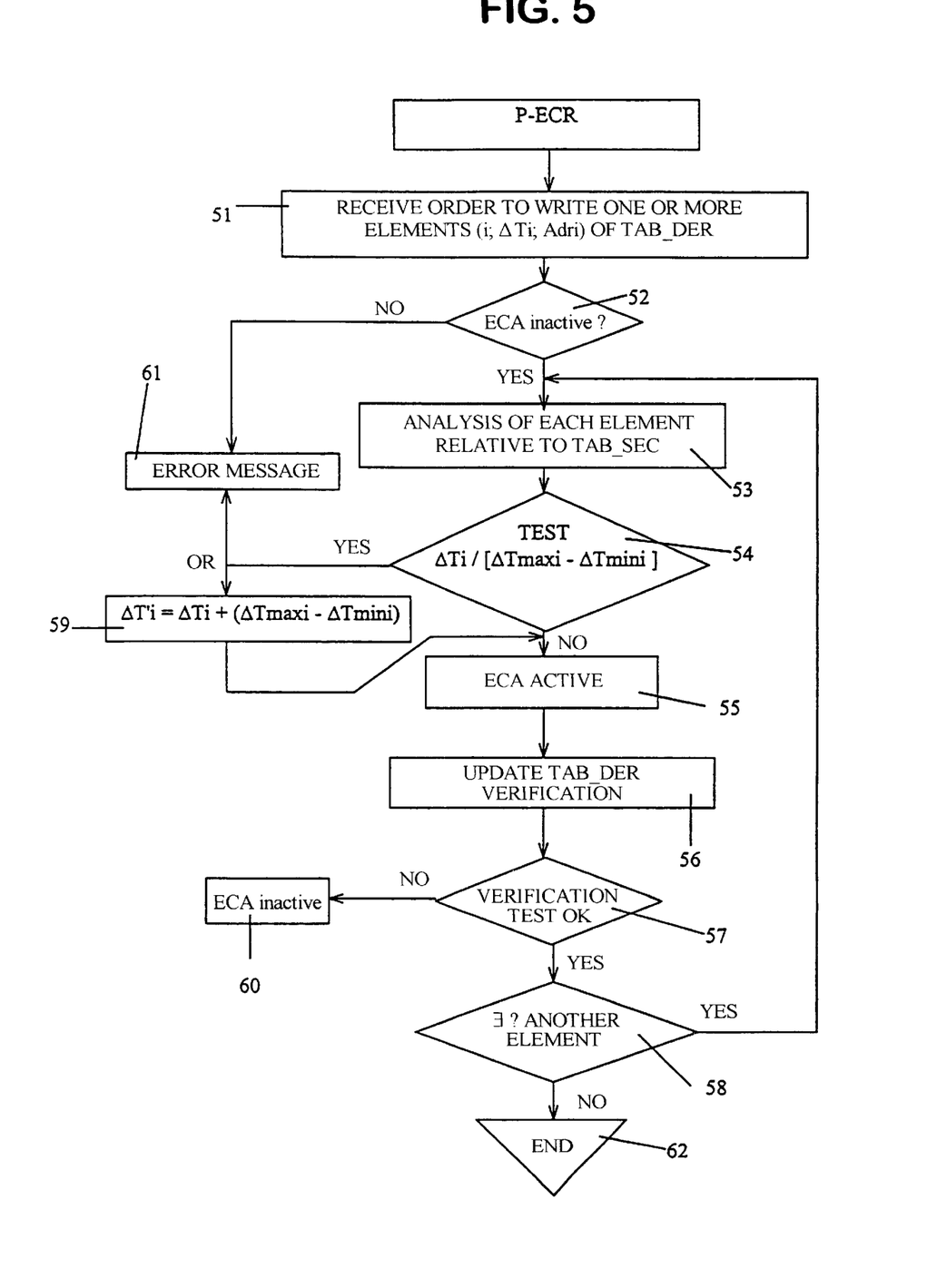
FIG. 5 represents the logical diagram of the program for writing into the branch table.

Finally, the application program or a part of the dormant code can include the write program, which can be called, for example by an orientation to a fixed initial address, in order to allow, through the orientation to this write program, the writing of the branch table TAB_DER in accordance with the sequence described in FIG. 5.

This program starts with a step for receiving an order to write one or more elements into the table TAB_DER, in which the elements $\Delta$Ti and Adri must be written on the line i of the element in the table. This step is followed by a step for testing the write flag ECA of the table in order to verify whether it is active or inactive. If ECA is active, the program continues with an error message in step 61. If ECA is inactive, the program continues with a step 53 for analyzing each element $\Delta$Ti relative to the corresponding value in the security table TAB_SEC. This step includes a test 54 for determining whether the value $\Delta$Ti falls within the interval [$\Delta$Tmaxi, $\Delta$Tmini]. If so, the program continues in step 22043B with a modification of $\Delta$Ti representing the value of the interval, in order to delay the interrupt so that it does not fall within the prohibited sequence. A variant, represented in parallel, is comprised of sending a message 22043A.

This is represented in step 59 by the operation comprised of replacing ($\Delta$Ti) with the value ($\Delta$Ti+x), x being the interval ($\Delta$Tmaxi–$\Delta$Tmini). In the case where the $\Delta$T does not fall within the interval, or after a modification of the value $\Delta$Ti, the program continues with step 55, in which the write flag ECA of the table is set to the active state.

Once this step has been executed, the program continues in step 56 with an update of the branch table and a verification of the write operation. This verification is carried out by means of a test represented in step 57. If the test confirms that the write operation is correct, the program continues with a test to see if there is another element to be written. If not, the program ends with step 62; if so, the program loops back to step 53.

If the verification test is negative, the program continues with step 60 for setting the write flag to the inactive state.

In a variant of the invention, using the table TAB_DER, it is possible to protect certain code parts without disturbing the capabilities for modifying the other parts.

A third variant is comprised of storing in the table TAB_SEC in ROM the start and end addresses associated with each of the sensitive sequences. The address values are easily determined and are not the result of a calculation for determining a duration, as above.

For example, a TAB_SEC in which each line represents the start and end addresses of sensitive sequences:

| Start address | End Address |
|---|---|
| Adrdeb_1 | Adrfin_1 |
| Adrdeb_2 | Adrfin_2 |

Advantageously, the address windows [Adrdeb_i, Adrfin_1] are stored in order of increasing addresses, which facilitates the reading of the table. Consequently, the values located in the intervals ]Adrfin_i,Adrdeb_i+1[ are address values of the non-sensitive program.

The verification of the interruption of a sensitive sequence is carried out at the end of the time delay. When the timer reaches the null value, an interrupt is triggered and the current value of the PC is placed in the stack, then the program is branched to the address defined in the part of the ROM containing what is commonly called an "interrupt vector." The designer of the program has taken care to initialize the value of the vector corresponding to interrupt generated by the end of the timer with the start address of the code sequence of the interrupt. Said routine is in ROM, and therefore non-modifiable for security reasons, so it will always be executed.

At the start of said code sequence of the interrupt, it is verified that the value of the PC (Val_PC) stored in the stack (i.e., the address of the instruction that the microprocessor would have to execute if there were no interrupt) is not an address value of a sensitive sequence. It the table TAB_SEC does not exist or is empty, the test is not performed and the program executes the new code sequence directly. Otherwise, the program of the routine extracts the value Val_PC from the stack and searches in the table TAB_SEC to see which address values it is located between.

If the values are of the [Adrdeb_i, Adrfin_i] type, the program has been interrupted during a sensitive sequence, and the card can return a message indicating that its security has been breached and can be inhibited. If the values are of the ]Adrfin_i, Adrdeb_i+1[ type, the program has been interrupted during a nonsensitive sequence, and the program then executes the new code sequence whose start address was stored during the processing of the orientation point.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

APPENDIX 1

Shown below is an executable code part of a main program, which code was written in a MOTOROLA 6805 assembler:

| | | | |
|---|---|---|---|
| adr_0 | LDX | #01 | Loading of the pointer with the number of the orientation point |
| | JSR | INS_ORT | Jump to the orientation point |
| | NOP | | |
| adr_1 | LDX | #080H | Loading of the hexadecimal value 80 into the pointer X. |
| | LDA | ,X | Loading of the accumulator A with the content of the address 80. |

APPENDIX 1-continued

Shown below is an executable code part of a main program, which code was written in a MOTOROLA 6805 assembler:

| | | | |
|---|---|---|---|
| | BEQ | V_ZERO | Jump if equal to zero to V_ZERO, otherwise next instruction. |
| adr_2 | LDB | #010d | Loading of the accumulator B with the decimal value 10 |
| adr_3 | MUL | | multiplication of A by B |
| | STA | Reg_H | Storage of the content of H in the accumulator A. |
| | STB | Reg_L | Storage of the content of L in the accumulator B. |
| | JSR | Write_Word | |
| V_ZERO | JMP | Next | |

APPENDIX 2

| | | |
|---|---|---|
| Adri | LDB | #020d |
| | JMP | adr_3 |

What is claimed is:

1. A device for modifying code sequences in a medium comprising a central processing unit (1) for executing code sequences, a first memory (2) containing a program comprising at least one code sequence executable by the central processing unit (1), and a second programmable memory (3), said device comprising:
a branch table TAB_DER stored in the second programmable memory, said branch table TAB_DER having at least one field containing reference data for a new code sequence stored in one of said memories, said new code sequence being executable at a predetermined address of said program;
a set of orientation points distributed in the program, said predetermined address being defined as a predetermined time delay passed from a given one of said orientation points to reach said predetermined address;
branching instructions allowing a deferred branch from a code sequence of the program to said new code sequence, wherein a decision as to when to perform the branch being determined by counting down said predetermined time delay from said given one orientation point until said time has elapsed; and
means provided in the new code sequence allowing, once the new code sequence has been executed, a return to a point of said code sequence of the program.

2. The device for modifying code sequences according to claim 1, characterized in that the branching instructions comprise activatable orientation instructions (IORi) previously stored in the memory containing the code of the program at said orientation points, each orientation instruction being associated with a reference (i) of the branch table TAB_DER written into programmable memory (3).

3. The device for modifying code sequences according to claim 2, characterized in that each orientation instruction (IORi) activated triggers the execution of a new code sequence comprising:
means for reading in the table TAB_DER of the programmable memory (2) a time delay ΔTi corresponding to the reference of the orientation instruction, which time delay makes it possible to defer the triggering of an interrupt that executes a jump to a new code sequence whose address (Adri) is indicated in the table, in association with the time delay, means for storing the address (Adri) in a memory of the device and means for starting a timer (6) of the device for counting down the time required for the time delay of the jump.

4. The device for modifying code sequences according to claim 3, characterized in that it comprises a second table TAB_SEC stored in the memory of the device and associating with each branch point (i) a time interval [ΔTmini; ΔTmaxi] associated with the time delay ΔTi prior to the execution of a new code sequence, and means for verifying that the time delay is authorized by the associated time interval provided by this table.

5. The device for modifying code sequences according to claim 4, characterized in that it comprises means that allow the time delay ΔTi to be shifted by the value of the time interval [ΔTmini; ΔTmaxi].

6. The device for modifying code sequences according to claim 4, characterized in that it comprises means for triggering an error message when the time delay ΔTi is within the time interval.

7. The device for modifying code sequences according to claim 3, characterized in that it comprises, following the end of the time delay (ΔTi) when the timer(6) reaches the null value, means for triggering an interrupt, means for storing the current value of a program counter register PC in a stack, then means for branching the program to the address defined in the part of the ROM that contains interrupt vectors, which supply the start address of the code sequence of the interrupt, means for verifying that the value Val_PC of the program counter register PC stored in the stack is not an address value of a sensitive sequence contained in a table TAB_SEC, and means for modifying the execution of the operations.

8. The device for modifying code sequences according to claim 7, characterized in that either the verification means sense that the value of the program counter register is contained by TAB_SEC in the interval [Adrdeb-i, Adrfin_1) corresponding to an interruption of the program during a sensitive sequence and the means for modifying the execution of the operations of the card return a message indicating that its security has been breached and is inhibited, or the verification means sense that the value of the program counter register Val_PC is contained in the interval ]Adrfin_i, Adrdeb_i+1[ corresponding to an interruption of the program during a nonsensitive sequence and the means for modifying the execution of the operations then authorize the program to execute the new code sequence whose start address was stored during the execution of the orientation instruction (IORi).

9. The device for modifying code sequences according to claim 1, characterized in that it comprises a timer (6) and a first and a second frequency source, the first frequency source being associated with the timer (6) and being different from the second frequency source that allows the central processing unit (1) to run the program, a time delay (ΔTi) programmed into the branch table TAB_DER, the value of the time delay (ΔTi) being calculated so as to allow the program to be interrupted at a given address, and the table TAB_DER comprises for each value of the time delay an additional element containing this given address and means for comparing the address of the instruction interrupted by the interrupt to the one indicated in the table, and for triggering an alarm.

10. The device for modifying code sequences according to claim 9, characterized in that it comprises alarm triggering means for inhibiting the medium and for indicating an attempted fraud through a write operation in the first memory.

11. The device for modifying code sequences according to claim 1, comprising a timer (6) for establishing a time delay value (Δti) and characterized in that each new code sequence ends with an orientation instruction for reloading the timer (6) with a new time delay value (Δti).

12. The device for modifying code sequences according to claim 3, comprising a timer (6) for establishing a time delay value (Δti) and characterized in that each new code sequence ends with an orientation instruction for reloading the timer (6) with a new time delay value (Δti).

13. A method for modifying code sequences in a medium comprising a central processing unit (1) capable of executing code sequences, a first memory (2) containing a program comprising at least one code sequence executable by the central processing unit (1), and a second programmable memory (3), said method comprising:

storing a branch table TAB_DER in the second programmable memory, containing at least one field containing reference data for a new code sequence stored in one of said memories, said new code sequence being executable at a predetermined address of said program;

distributing a set of orientation points in said program, said predetermined address being defined as a predetermined time delay passed from a given one of said orientation points to reach said predetermined address;

providing branching means in said medium, which performs a branch from a code sequence of said program to said new code sequence, wherein a decision as to when to perform the branch being determined by counting down said predetermined time delay from said given one orientation point until said time as elapsed; and providing return means in the new code sequence for performing, once the new code sequence has been executed, a return to said code sequence of the program.

14. The method according to claim 13, wherein the step of performing the branch is preceded by a verification step comprised of verifying that said predetermined time is not included in an interval defined by a second, security table TAB_SEC written into said first or second memory of the medium.

15. A device for modifying code sequences in a medium comprising a central processing unit (1) for executing code sequences, a first memory (2) containing a program comprising at least one code sequence executable by the central processing unit (1), and a second programmable memory (3), said device comprising:

a branch table TAB_DER contained in the second programmable memory, said branch table TAB_DER having at least one field containing reference data for a new code sequence stored in one of said memories;

branching instructions allowing a deferred branch from a code sequence of the program to said new code sequence; and means provided in the new code sequence allowing, once the new code sequence has been executed, a return to a point of said code sequence of the program, wherein branching instructions comprise activatable orientation instructions (IORi) previously stored in the memory containing the code of the program, each orientation instruction being associated with a reference (i) of the branch table TAB_DER written into programmable memory (3); and, wherein each orientation instruction (IORi) activated triggers the execution of a new code sequence comprising:

means for reading in the table TAB_DER of the programmable memory (2) a time delay ΔTi corresponding to the reference of the orientation instruction, which time delay makes it possible to defer the triggering of an interrupt that executes a jump to a new code sequence whose address (Adri) is indicated in the table, in association with the time delay, means for storing the address (Adri) in a memory of the device and means for starting a timer (6) of the device for counting down the time required for the time delay of the jump.

16. The device for modifying code sequences according to claim 15, characterized in that it comprises a second table TAB_SEC stored in the memory of the device and associating with each branch point (i) a time interval [ΔTmini; ΔTmaxi] associated with the time delay ΔTi prior to the execution of a new code sequence, and means for verifying that the time delay is authorized by the associated time interval provided by said second this table.

17. The device for modifying cod sequences according to claim 16, characterized in that it comprises means that allow the time delay ΔTi to be shifted by the value of the time interval [ΔTmini; ΔTmaxi].

18. The device for modifying code sequences according to claim 17, characterized in that it comprises means for triggering an error message when time delay ΔTi is within the time interval.

19. The device for modifying code sequences according to claim 15, characterized in that it comprises, following the end of the time delay (ΔTi) when the timer (6) reaches the null value, means for triggering an interrupt, means for storing the current value of a program counter register PC in a stack, then means for branching the program to the address defined in the part of the ROM that contains interrupt vectors, which supply the start address of the code sequence of the interrupt, means for verifying that the value Val_PC of the program counter register PC stored in the stack is not an address value of a sensitive sequence contained in a table TAB_SEC, and means for modifying the execution of the operations.

20. The device for modifying code sequences according to claim 19, characterized in that either the verification means sense that the value of the program counter register is contained by TAB_SEC in the interval [Adrdeb-i, Adrfin_1) corresponding to an interruption of the program during a sensitive sequence and the means for modifying the execution of the operations of the card return a message indicating that its security has been breached and is inhibited, or the verification means sense that the value of the program counter register Val_PC is contained in the interval ]Adrfin_i, Adrdeb_i+1[ corresponding to an interruption of the program during a nonsensitive sequence and the means for modifying the execution of the operations then authorize the program to execute the new code sequence whose start address was stored during the execution of the orientation instruction (IORi).

21. The device for modifying code sequences according to claim 15, comprising a timer (6) for establishing a time delay value (Δti) and characterized in that each new code sequence ends with an orientation instruction for reloading the timer (6) with a new time delay value (Δti).

22. A device for modifying code sequences in a medium comprising a central processing unit (1) for executing code sequences, a first memory (2) containing a program comprising at least one code sequence executable by the central processing unit (1), and a second programmable memory (3), said device comprising:

a branch table TAB_DER contained in the second programmable memory, said branch table TAB_DER having at least one field containing reference data for a new code sequence stored in one of said memories;

branching instructions allowing a deferred branch from a code sequence of the program to said new code sequence;

means provided in the new code sequence allowing, once the new code sequence has been executed, a return to a point of said code sequence of the program;

a timer (6) and a first and a second frequency source, the first frequency source being associated with the timer (6) and being different from the second frequency source that allows the central processing unit (1) to run the program; and a time delay (ΔTi) programmed into the branch table TAB_DER, wherein the value of the time delay (ΔTi) being calculated so as to allow the program to be interrupted at a given address, and the table TAB_DER comprises for each value of the time delay an additional element containing the given address and means for comparing the address of the instruction interrupted by the interrupt to the one indicated in the table, and for triggering an alarm.

23. The device for modifying code sequences according to claim 22, characterized in that it comprises alarm triggering means for inhibiting the medium and for indicating an attempted fraud through a write operation in the first memory.

\* \* \* \* \*